(12) United States Patent
Chen et al.

(10) Patent No.: US 6,719,841 B2
(45) Date of Patent: Apr. 13, 2004

(54) MANUFACTURING METHOD FOR HIGH-DENSITY MAGNETIC DATA STORAGE MEDIA

(75) Inventors: Yunjie Chen, Singapore (SG); Jian-Ping Wang, Singapore (SG)

(73) Assignee: Data Storage Institute, Singapore (SG)

( * ) Notice: Subject to any disclaimer, the term of this patent is extended or adjusted under 35 U.S.C. 154(b) by 58 days.

(21) Appl. No.: 10/141,577

(22) Filed: May 9, 2002

(65) Prior Publication Data

US 2003/0091865 A1 May 15, 2003

(30) Foreign Application Priority Data

Nov. 9, 2001 (SG) ........................... 200106926-9

(51) Int. Cl.[7] ..................... C30B 29/66; C30B 25/04
(52) U.S. Cl. .................... 117/87; 117/89; 117/90; 117/95; 117/97; 117/101; 117/106; 117/939
(58) Field of Search ............... 117/89, 87, 90, 117/95, 97, 101, 106, 939

(56) References Cited

U.S. PATENT DOCUMENTS

| 5,772,905 A | 6/1998 | Chou |
| 5,956,216 A | 9/1999 | Chou |
| 6,162,532 A | 12/2000 | Black et al. |
| 6,242,085 B1 | 6/2001 | Ryonai et al. |
| 6,416,880 B1 * | 7/2002 | Miller ........................ 428/611 |
| 6,566,665 B2 * | 5/2003 | Baglin et al. ............ 250/492.2 |

FOREIGN PATENT DOCUMENTS

| EP | 0710949 | 5/1996 |
| WO | WO 01/26101 A1 | 4/2001 |

* cited by examiner

*Primary Examiner*—Robert Kunemund
(74) *Attorney, Agent, or Firm*—Nixon & Vanderhye P.C.

(57) ABSTRACT

A method of fabricating a high-density magnetic data-storage medium, the method comprising the steps of: (a) forming a plurality of nanodots of non-magnetic material in a regular array on a surface of a substrate, said array being notionally dividable into a plurality of clusters that each comprise a plurality of nanodots, wherein each nanodot of a said cluster overlaps with neighbouring nanodots of that cluster to form a well between them; (b) depositing magnetic material onto said substrate to at least partly fill the wells of each cluster; and (c) removing material to reveal a regular array of wells filled with magnetic material, each of said wells being separated from neighbouring wells by non-magnetic material.

36 Claims, 9 Drawing Sheets

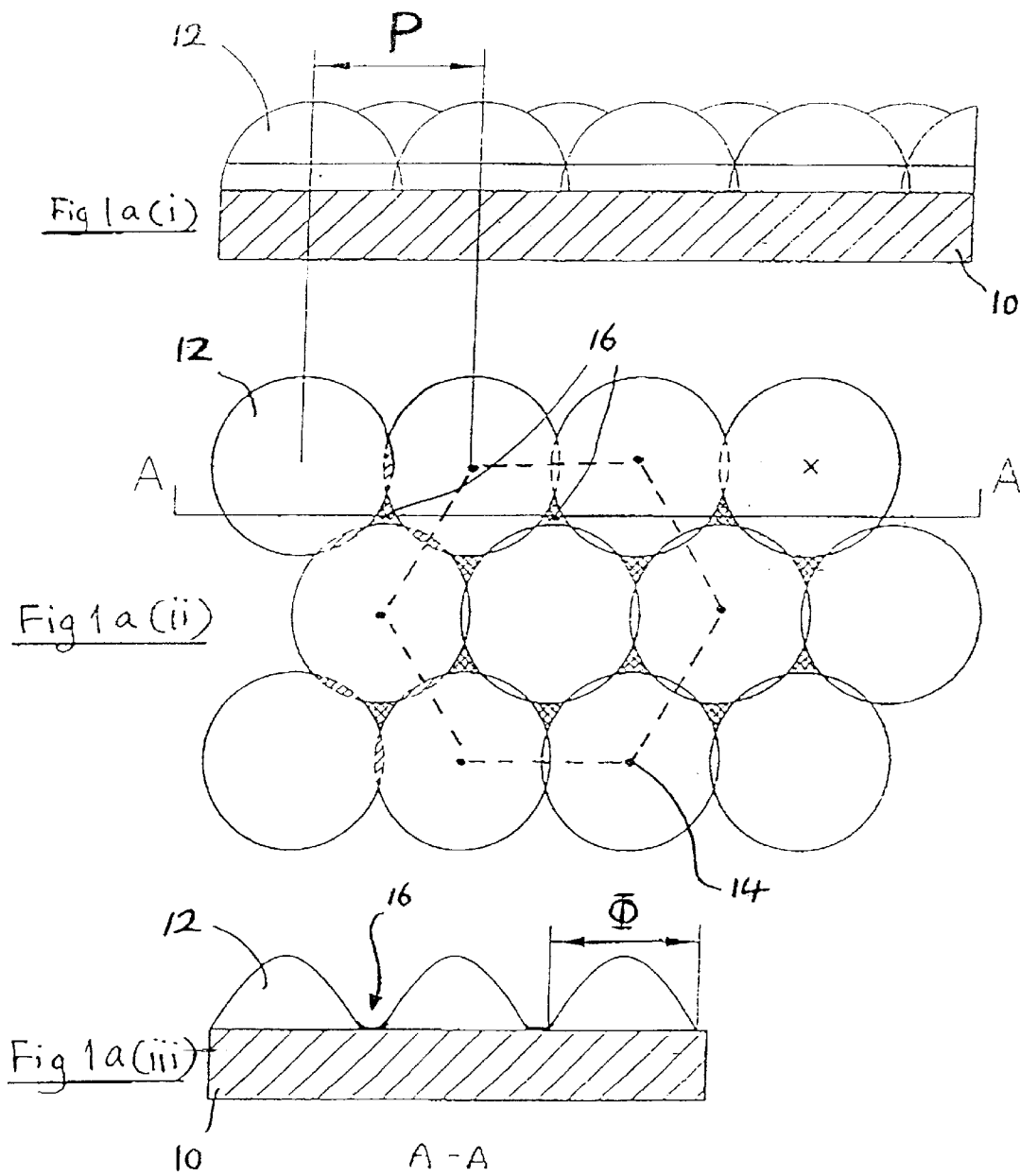

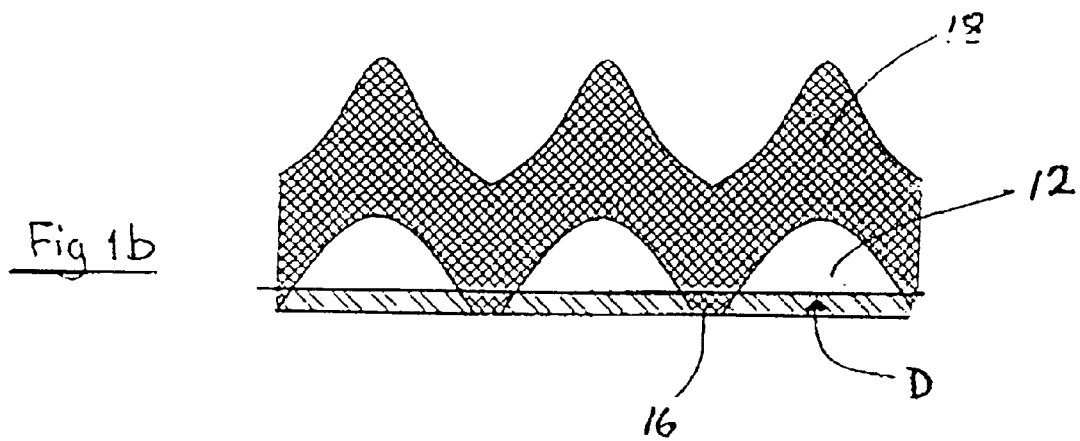
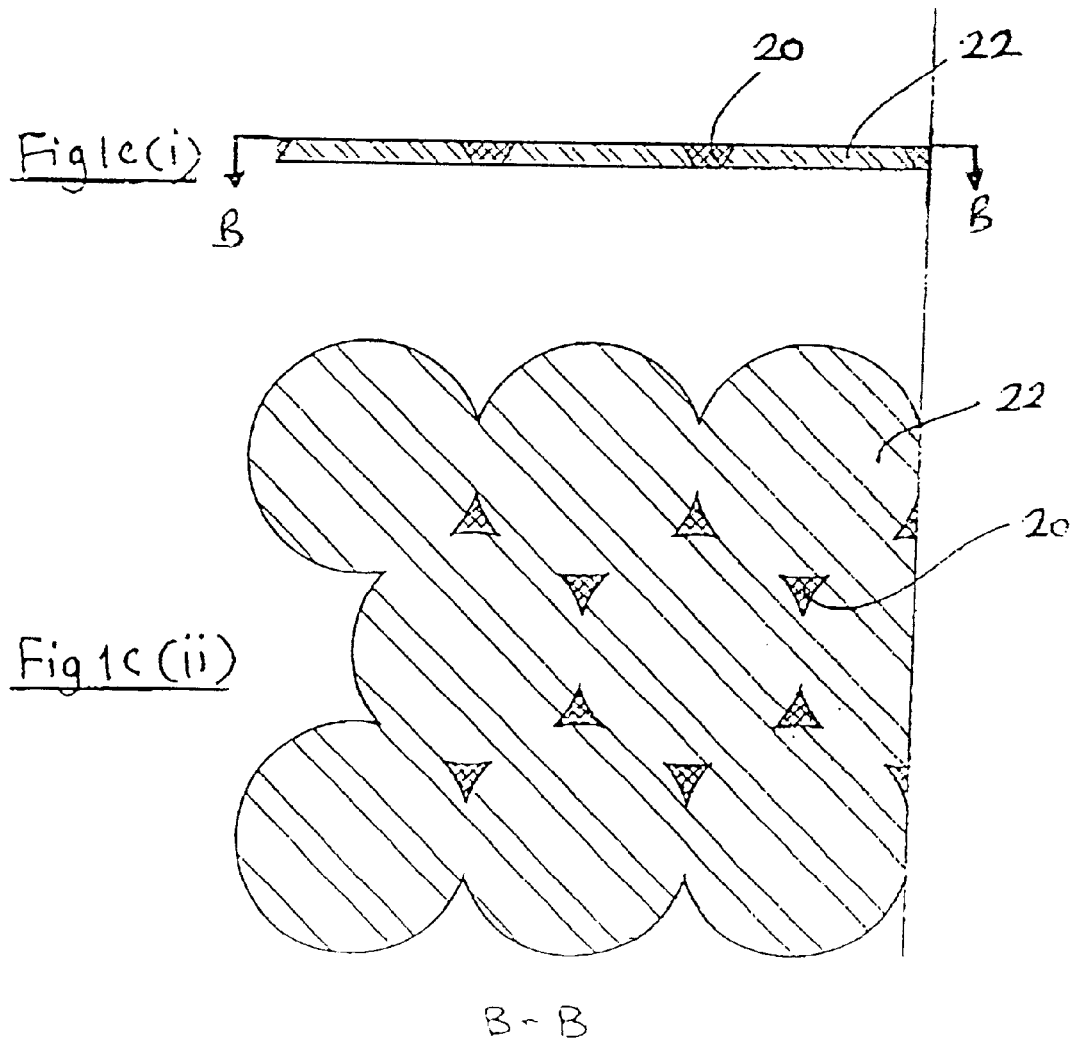

MANUFACTURING METHOD FOR HIGH-DENSITY MAGNETIC DATA STORAGE MEDIA

FIELD OF THE INVENTION

This invention relates to manufacturing methods for high-density magnetic data-storage media. Other embodiments of the invention relate to high-density magnetic data storage media in general, and to high-density magnetic data storage media manufactured in accordance with the aforementioned method.

BACKGROUND TO THE INVENTION

Magnetic recording technology has been driven by a strong demand for faster access speeds and for higher data storage density. To meet this demand, the areal density (i.e. the number of bits that can be stored per unit area) of magnetic hard disk data storage devices (HDDs) has been increasing rapidly year on year since 1991.

Recently, companies such as Read-Rite and Fujitsu have demonstrated that HDDs can be constructed that provide storage densities of 50 Gbit/in$^2$ and above, and it therefore seems likely that an areal density of 200–300 Gbit/in$^2$ will be achievable within a few years.

However, it has been predicted that current media will encounter a physical limit which will prevent, or at least make very difficult, the manufacture of high-density magnetic storage media with an areal density of over 200–300 Gbit/in$^2$.

Currently used thin film magnetic recording media typically consist of a plurality of small, single-domain magnetic grains, which are magnetically isolated from one another. For an acceptable media signal-to-noise ratio (SNR), each recording bit must contain a number of magnetic grains. Typically several tens to several hundreds of magnetic grains in each written bit are used, with each grain having a diameter in the range of 10–20 nm or so.

To increase the storage density beyond that provided by these current media, the size of the multigrain bits (and therefore each grain in each bit) must be reduced yet further. However, if the grain size is too small, the magnetisation applied to the bit cannot be retained against thermal decay due to the very small energy barrier height. As a consequence, applied magnetisation would be able to switch easily, and thus recorded data could be lost. This phenomenon is the so-called "superparamagnetism" or "thermal-instability"limit, which is the root cause of the physical areal density limit of current HDDs.

To avoid this limit it has recently been proposed to use patterned media in high-density magnetic storage media with an areal density of from 100 Gbit/in$^2$ to tens of Tbit/in$^2$.

The term "patterned media" is used generally in the art to refer to media that consist of regular arrays (i.e. patterns) of discrete magnetic elements, which can each store one bit of data. Such bits are arranged periodically to be synchronised with the signal channel. In the simplest of these proposals the elements have only a single axis of magnetisation that is interpreted as a binary 1 or 0, and in such a situation the storage density of the HDD is then equal to the surface density of the elements.

In patterned media devices, each discrete element is magnetically isolated from other elements, and inside each discrete element individual polycrystalline grains are strongly exchange-coupled so that they behave more like a larger single magnetic grain. These "single-domain" magnetic elements can be made of polycrystalline materials as well as single crystal and amorphous materials.

Because the superparamagnetism limit applies to the whole single bit (because the individual grains behave more like a larger single grain), and not to each of the many grains (as it does in a continuous multigrain bit of a conventional medium), the volume and switching energy for the single-element bits in patterned media are much larger than that of single grains in conventional media. This allows a significant reduction in bit size. The minimum volume of the discrete element will still be determined by the superparamagnetic limit, but the size of the element could be as small as a few nanometers, depending on the magnetic properties of the materials. A reduction in element size to in the region of a few nanometers would give the patterned medium all areal density as high as tens of Tbit/in$^2$.

Another advantage of these so-called patterned media is that the SNR for the read head is increased because random $N^{1/2}$ noise associated with acceptable numbers of decoupled grains within each continuous multigrain bit is no longer applicable, and because noise associated with irregular or zigzag transitions typical of continuous thin film media is reduced.

However, one problem with patterned media or the like is that their areal density implies that both the linear bit density (bits per inch) and the track density (tracks per inch) must be in the deep sub-micrometer range, and as a result they cannot currently be cheaply manufactured using mass-production techniques.

Conventional lithographic methods either are too time-consuming or do not handle the small structure sizes needed. For example, electron beam lithography is too slow to cover large areas, and laser interferometric lithography is wavelength limited to areal densities of 100 Gbit/in$^2$ or less by currently available short-wavelength lasers.

A major challenge is therefore to find a low cost nano-pattern generation technique that would enable these patterned media to be cheaply mass-produced.

Recently, several new techniques such as nanoimprint lithography (as utilised in U.S. Pat. Nos. 5,772,905, and 5,956,216), self-assembly using chemically monodispersed nanoparticles (as described in U.S. Pat. No. 6,162,532), and nano-templates formed from self-assembled diblock copolymer thin films (see Nikkei Electronics Asia, November 2000 issue) have been employed to fabricate prototype patterned media. However, these techniques, whilst holding some promise, are not well proven at present.

It is therefore an aim of the present invention to provide an alternative technique for the manufacture of nano-pattern media. In pursuit of this aim it has been observed that periodic ripple structures with sub-micrometer to nanometer width can be formed on semiconductor and metal surfaces by ion bombardment at off-normal-incidence angles (see S. Rusponi et al "Scaling Laws of the Ripple Morphology on Cu(110)", Phys. Rev. Lett., 81, 4184 (1998); and R. M. Bradley et al "Theory of Ripple Topography Induced by Ion Bombardment", J. Vac. Scl. Technol. A 6, 2390 (1988)—the contents of which are incorporated herein by reference), and recent results show that it is possible to form ordered crystalline dots of about 35 nm in diameter in a regular hexagonal lattice on GaSb surfaces by ion bombardment at normal incidence angle (see S. Facsko et al, "Formation of Ordered Nanoscale Semiconductor Dots by Ion Sputtering", Science 285, 1551 (1999) —the contents of which are incorporated herein by reference). Generally speaking, these self-ordering nanostructures on semiconductor or metal surfaces are caused by the interplay between roughening due to sputtering, and smoothing because of surface diffusion/viscous flow.

It is a general object of the present invention to use these observed patterning phenomena to provide a method for fabricating high-density magnetic data storage media.

SUMMARY OF INVENTION

In accordance with a preferred embodiment of the present invention, there is provided a method of fabricating a high-density magnetic data-storage medium, the method comprising the steps of:

(a) forming a plurality of nanodots of non-magnetic material in a regular array on a surface of a substrate, said array being notionally dividable into a plurality of clusters that each comprise a plurality of nanodots, wherein each nanodot of a said cluster overlaps with neighbouring nanodots of that cluster to form a well between them;

(b) depositing magnetic material onto said substrate to at least partly fill the wells of each cluster; and (c) removing material from the substrate to reveal a regular array of wells filled with magnetic material, each of said wells being separated from neighbouring wells by non-magnetic material.

In the context of the present invention, a high-density magnetic data-storage medium is defined as one with an areal density of at least 100 Gbit/in$^2$; and a nanodot is defined as a projection or dot with dimensions that are small enough to enable an areal density of this order to be achieved (i.e. generally in the order of tens of nanometers or less).

Preferably, the wells formed as a result of step (a) are at least substantially free of said non-magnetic material.

The magnetic material can be deposited in step (b) as a layer that fills the wells and extends over the non-magnetic nanodots.

Other details of the preferred embodiment are set out in the dependent claims, and in the following description.

By employing the teachings of embodiments of the invention, each discrete magnetic element can be separated from other elements by nonmagnetic materials so that the likelihood of exchange interactions taking place between neighbouring elements is reduced.

In one highly preferred embodiment, GaSb (Gallium Antinomide) wafers or epitaxy-grown GaSb films on non-magnetic substrates are ion sputtered to obtain ordered arrays of nanodots (a pattern). The pattern is then transferred into deep wells (preferably right down to the substrate) by reactive ion etching with a thin layer of aluminum as protection deposited on the top of the nanodots and the overlapping regions between nanodots, before etching begins. Finally, magnetic materials are grown into the wells, for example by electrodeposition, sputtering, or evaporation, and the top surface of the medium is then polished to reveal isolated areas of magnetic material, and subsequently preferably coated with an abrasion-resistant material like carbon.

In very general terms, the scope of the present invention extends to a method of fabricating a high-density magnetic data storage medium comprising the steps of: forming a plurality of non-magnetic nanodots on a substrate (for example by utilising one of the aforementioned methods—particularly the method described in the aforementioned Facsko paper) so that each of said nanodots overlaps with its neighbours to form wells; depositing magnetic material into said wells, and removing material to reveal a plurality of magnetic-material-filled wells separated from one another by non-magnetic material.

BRIEF DESCRIPTION OF THE DRAWINGS

Preferred embodiments of the present invention will now be described, by way of illustrative example only, with reference to the accompanying drawings, in which:

FIGS. 1a(i) through 1a(iii) are schematic representations of a cluster of nanodots on a surface of a substrate. FIG. 1a(i) is an elevation of the substrate, FIG. 1a(ii) is a plan view of the substrate, and FIG. 1a(iii) is a cross-sectional view along the line A—A of FIG. 1a(ii);

FIG. 1b is a schematic elevation of the substrate shown in FIG. 1a(iii) with a layer of magnetic material deposited thereover;

FIGS. 1c(i) and 1c(ii) are elevation and plan views, respectively, of the substrate of FIG. 1b once that substrate has been polished, FIG. 1c(ii) being a cross-sectional view along the line B—B of FIG. 1c(i);

FIG. 6b is the top view of FIG. 6a.

DETAILED DESCRIPTION OF THE PREFERRED EMBODIMENTS

Figure 2A:
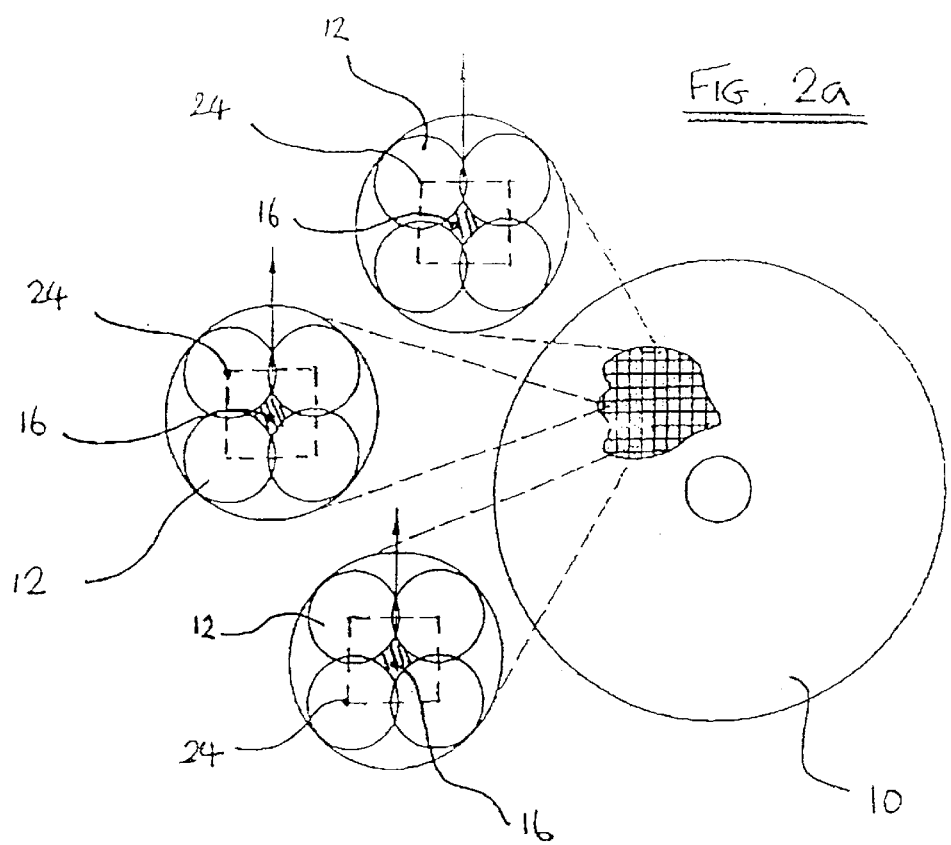
FIG. 2a and 2b are schematic representations of alternative nanodot patterns that can be formed on the surface of a substrate.

As will be apparent once the following description has been read, embodiments of the present invention relate to methods by means of which a pattern of nanodots can be formed on the surface of a medium. As will be explained below, the patterns can consist of hexagonal or square clusters of nanodots, and those patterns extend over substantially all of the surface of the media. In an alternative arrangement, a pattern of square nanodot clusters can be formed in a so-called polar array on the medium. Three different methods for the production of these patterns will also be described.

FIGS. 1a(i) through 1a(iii) are schematic representations of a substrate 10 after the substrate has been etched by an ion sputtering (or ion bombardment) process.

Generally speaking, in this first embodiment of the invention magnetic material is deposited directly onto a pattern formed in a substrate. In later embodiments, masks are employed to protect the pattern before the magnetic material is deposited. It should be noted that the embodiments of the invention to be described can utilise any of the three substrate patterns described hereinafter.

To illustrate the first embodiment of the invention, FIG. 1 shows the surface of a GaSb (Gallium Antinomide) substrate 10 that has been bombarded with Ar$^+$ (argon ions) having an energy in the region of 400–500 eV. In this example, the ion bombardment has occurred under normal incidence[1] at a flux of approximately $0.6 \times 10^{16}$ ions/cm$^2$s (i.e., a beam current density of approximately 1 mA/cm$^2$) and a dosage of approximately $4 \times 10^{18}$ ions/cm$^2$ (although it should be noted that the ion bombardment can be accomplished differently if a different pattern is to be formed). The ion beam used to bombard the surface of the substrate (in this embodiment) is incident upon substantially all of the surface of the substrate, and as a consequence the pattern formed extends over substantially all of the surface of the substrate.

Bombardment of the substrate surface in this way forms a pattern comprising a plurality of generally dome-shaped nanodots 12 that are formed in a substantially regular hexagonal lattice (i.e. each nanodot is surrounded by six neighbouring nanodots) extending over substantially all of the surface of the substrate. The substrate can be stationary during bombardment, or alternatively it can be rotated so that the hexagonal clusters formed are more uniform.

The pattern of nanodots 12 can be notionally divided into hexagonal clusters 14 of seven neighbouring nanodots. As shown in FIG. 1a(ii), the seven neighbouring nanodots of each cluster overlap with one another to form six wells 16.

The lattice constant or periodicity P of the nanodots is generally in the order of 60 nm or so, and this corresponds to a surface density of the dots of about $4.5 \times 10^{10}$ cm$^{-2}$. The average diameter $\Phi$ (see FIG. 1a(iii)) of the generally uniformly-sized dots range from 18 nm to 50 nm and the height H of the crystalline nanodots is in the region of up to 30 nm, depending on the ion fluence or exposure time.

Advantageously, particularly when compared with other nanometer scale pattern-forming techniques, the above-described technique can provide a substantially regular nanodot pattern using a commercial sputtering system. Formation of the pattern occurs in one technological step (i.e. in one pass) and the substrate surface can be as large as several inches or more in diameter. It is rapid (within a few minutes), cost-effective, and highly suitable for mass-production.

Once the pattern of wells 16 and nanodots 12 has been formed on the substrate 10, the next step of the method is to form a layer 18 of magnetic material on the patterned surface. The layer of magnetic material is formed on the patterned surface by any one of a number of methods known to persons skilled in the art, for example by electrodeposition, sputtering, or evaporation. As shown in FIG. 1b, the layer 18 at least substantially fills the wells 16, and extends over neighbouring nanodots 12. The layer may be of any of a number of different magnetic materials known to persons skilled in the art, for example it may be of Cobalt; Nickel; or Iron. Alternatively, it may comprise an Iron, or Cobalt base alloy such as CoCrPt, CoPt, or FePt; Samarium Cobalt (SmCo$_5$), Mn$_3$Al, or it may comprise a multilayer structure, of (Co/Pt)$_n$ for example.

Once the layer 18 has been deposited, the next step is to remove material to reveal the wells filled with magnetic material and the intervening non-magnetic material. This removal step can be accomplished, for example, by polishing the layer 18 down to a depth D (see FIG. 1b) that is chosen to be significantly less than the height of the overlap between neighbouring nanodots. Once the polishing has been completed an ordered array of magnetic nanodots 20 separated by nonmagnetic material 22 is revealed (see FIGS. 1c(i) and 1c(ii)).

As mentioned above, FIGS. 2a and 2b illustrate schematically two alternative nanodot patterns that can be formed on the surface of the substrate 10, and any of the three nanodot patterns herein described can be used with any of the three embodiments of the method of the invention.

Specifically, FIG. 2a illustrates a "checkerboard" pattern of nanodot clusters, where each cluster comprises a "square" pattern of nanodots 12 with a nanodot formed at each corner of a notional square 24 and a single central well 16 between them. The square pattern 24 of FIG. 2a is formed by means of a two-exposure bombardment. First, the substrate surface is bombarded at an off-normal angle of incidence (typically in the region of 40 to 60°) by ions from an ion beam source that has an elliptically shaped grid for uniformity, followed by a second exposure with the same ion beam source and the same bombardment conditions after the substrate has been rotated by 90° around an axis normal to the substrate surface. As with the pattern illustrated in FIG. 1, the ion beam used to bombard the surface of the substrate (in this embodiment) is incident upon substantially all of the surface of the substrate, and as a consequence the square pattern formed extends over substantially all of the surface of the substrate.

As an alternative to using the same ion source for each bombardment, it will be apparent to persons skilled in the art that two sources may instead be used with those sources located at ninety degrees to one another in the circumferential direction of the substrate. These two sources can be operated simultaneously or one after the other without having to rotate the substrate through 90° as described above.

Figure 2B:
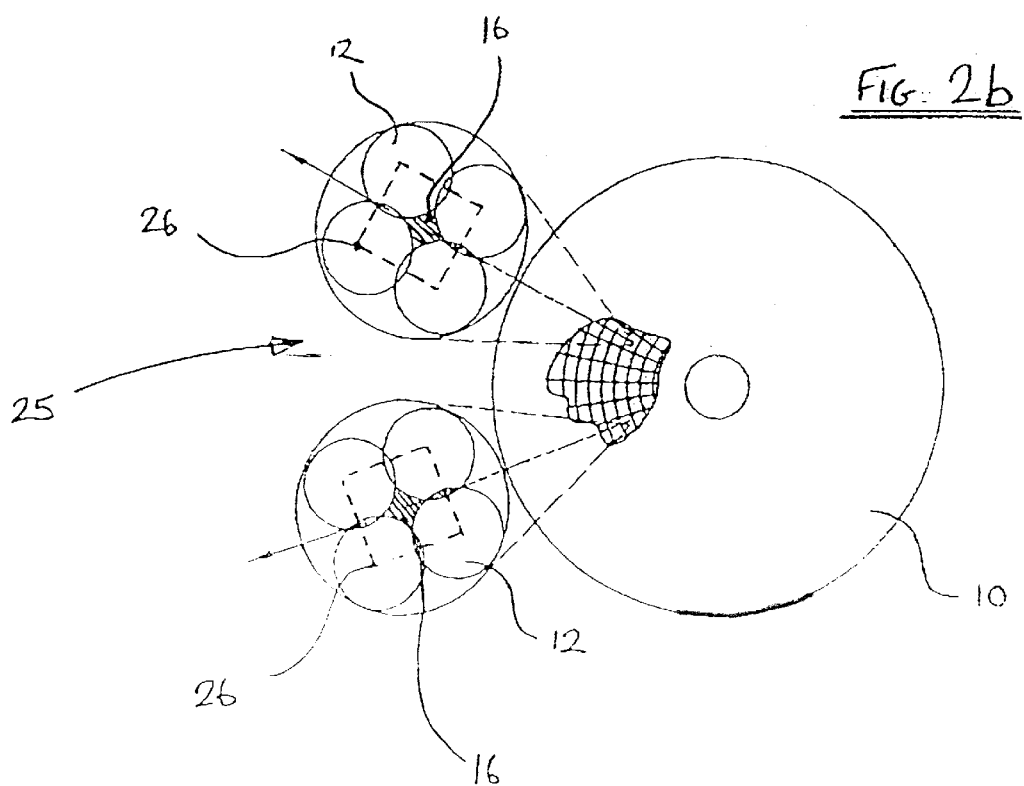

FIG. 2b is a schematic view of a nanodot pattern 25 which differs from that shown in FIG. 2a in that the pattern is polar. By "polar" we mean that the clusters of the pattern are formed in a regular array which extends outwardly from the centre of the substrate to the periphery of the substrate. This differs from the pattern of FIG. 2a where the array does not extend outwardly from the centre of the substrate but is instead is akin to a "checkerboard" not emanating from the centre of the substrate. The polar pattern of FIG. 2b is formed by means of a simultaneous dual-beam bombardment. To form this pattern a first ion beam source is used to bombard substantially the whole of the substrate at a normal angle of incidence (i.e. at an angle of incidence of substantially 0°), and simultaneously a second ion beam source is used to bombard a discrete radial section of the substrate with a uniform ion beam that is linear or slit-shaped, and which bombards the surface of the substrate at an off-normal angle of incidence (for example an angle of between 40 and 60°).

The substrate is rotated as it is simultaneously bombarded by both beams for a full rotation of the media until the polar pattern is formed. As shown in FIG. 2b, each cluster of the polar pattern 25 formed on the media consists of a plurality of square-shaped nanodot clusters 26 that are similar to those of FIG. 2a.

In both cases, the ion energy of the beams is in the region of 400–500 eV, the flux is in the region of $0.6 \times 10^{16}$ ions/cm$^2$ (i.e., a beam current density of approximately 1 mA/cm$^2$), and the dosage is in the region of $4 \times 10^{18}$ ions/cm$^2$.

As will be apparent from a detailed reading of this description, any of these patterns (namely the hexagonal pattern of FIG. 1, the checkerboard square pattern of FIG. 2a or the polar pattern of FIG. 2b) may be used in the fabrication methods of the three embodiments.

FIGS. 3a through 3d are schematic representations of steps of a fabrication method in accordance with a second embodiment of the invention. This method has more steps than the previous one, but is more practical for application and therefore more preferred.

Figure 3A:
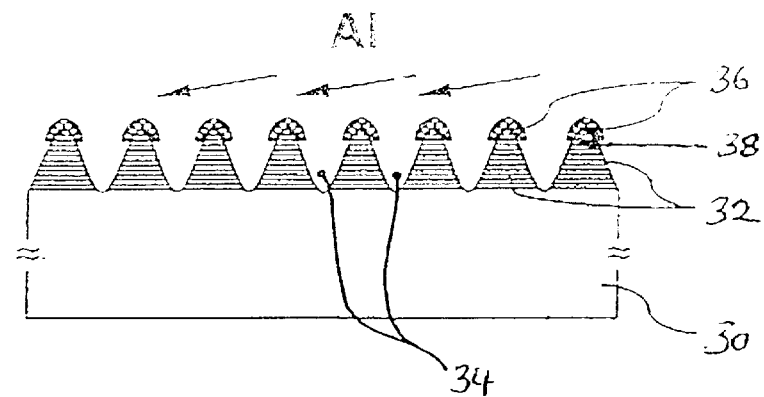
FIGS. 3a through 3d are schematic representations of steps of a fabrication method in accordance with a second embodiment of the invention.

Once the surface of a substrate 30 (for example a GaSb substrate) has been bombarded to form a nanodot pattern (for example, a pattern such as those shown in FIGS. 1, 2a or 2b), the first step (as shown in FIG. 3a) of this embodiment is to deposit on the bombarded surface 30 (formed with nanodots 32 and wells 34)—as the substrate is rotated—a thin layer 36 (for example about 10 nm in thickness) of aluminium. The aluminium layer is formed by evaporation at such an angle that only top portions 38 and overlapping portions (not visible) of the nanodots are covered with alulminium (i.e. the wells are left substantially free of aluminium). Typically, an angle in the region of 0 to 10°, preferably 6°, will be sufficient. The aluminium layer on the top and overlapping portions of the nanodots functions to protect the underlying nanodots during subsequent steps of the method.

Figure 3B:
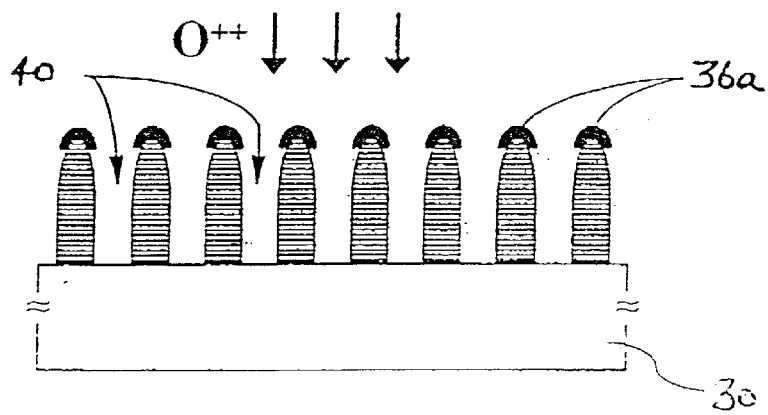

As shown in FIG. 3b, in the next step of the method reactive ion etching with oxygen ions is used to etch deep nanoholes 40 that preferably extend right down to the surface of the substrate 30. The hole size and depth can be adjusted by the aluminum thickness and etching conditions.

During this step of the method, the aluminium layer 36 on top of the nanodots and overlapping portions is oxidised into aluminium oxide 36a, and this aluminium oxide layer functions as a masking layer to protect the nanodots and overlapping areas.

Figure 3C:
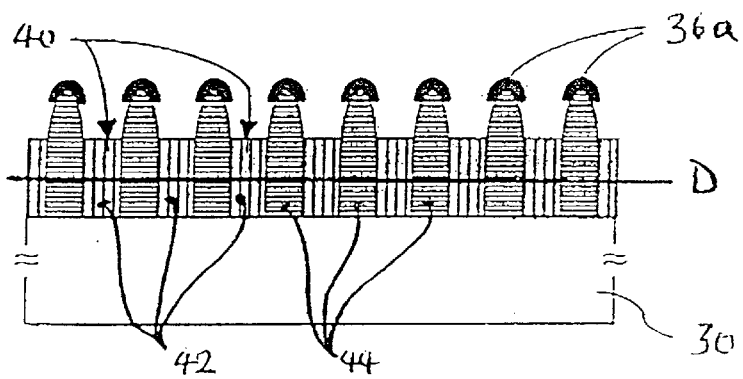
Figure 3D:
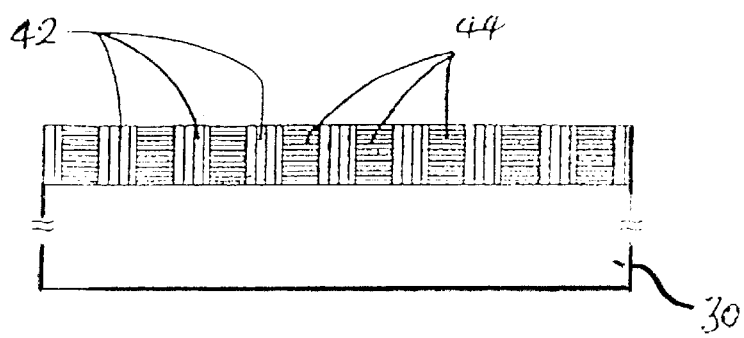

In the next step of the method, shown schematically in FIG. 3c, magnetic material is deposited into the nanoholes 40 by means of electroplating, sputtering or evaporation (or any other suitable means known to persons skilled in the art). It is preferred that electrodeposition is used because this method can efficiently fill the relatively large aspect ratio nanoholes 40 with continuous metal nanowires.

During the electrodeposition step, nanowires of magnetic material are grown in the nanoholes to form a periodic array of nanomagnets 42 separated by nonmagnetic material 44. The magnetic material may be of any of a number of different magnetic materials known to persons skilled in the art, for example it may be of Cobalt; Nickel; Iron; or Iron or Cobalt base alloys such as CoCrPt, CoPt or FePt; Samarium Cobalt ($SmCo_5$), $Mn_3Al$ or it may be a multilayer structure of $(Co/Pt)_n$ for example.

Once magnetic material has been grown into the nanoholes 40, the next step (illustrated schematically in FIG. 3d) is to remove material to reveal the filled holes 42 and intervening non-magnetic material 44. This removal step can be accomplished, for example, by polishing the surface down to a depth D that is chosen to be significantly less than the height of the overlap between neighbouring nanodots (formed prior to the step illustrated in FIG. 3a). Once the polishing has been completed an ordered array of nanomagnets 42 separated by nonmagnetic material 44 is revealed (see FIG. 3d).

FIGS. 4a through 4f illustrate steps of a method in accordance with a third embodiment of the invention.

Figure 4A:
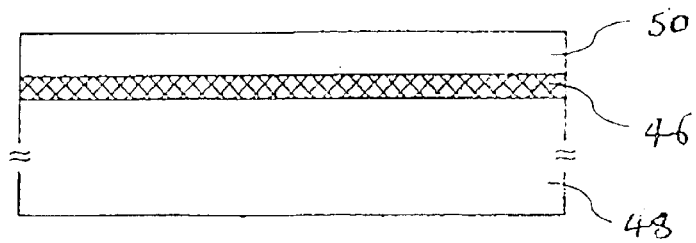
FIGS. 4a through 4f are schematic representations of steps of a fabrication method in accordance with a third embodiment of the invention.

In a first part of the method step illustrated in FIG. 4a, a 10–20 nm layer 46 of $Al_{09}Ga_{01}As_{05}Sb_{05}$ is epitaxy-grown by metal-organic vapor phase epitaxy (MOVPE) or molecular beam epitaxy (MBE) on top of a GaSb substrate 48. A 20–50 nm layer 50 of GaSb is then grown on top of the $Al_{09}Ga_{01}As_{05}Sb_{05}$ layer 46 by MOVPE or MBE for example.

Figure 4B:
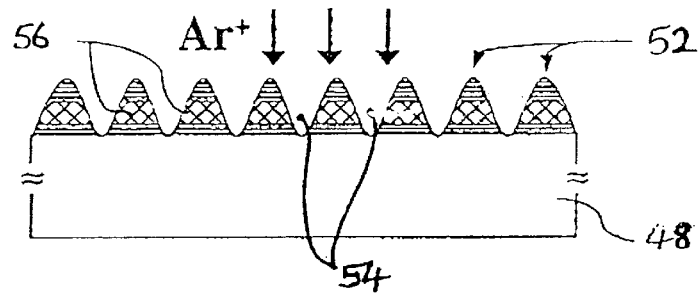
Figure 4C:
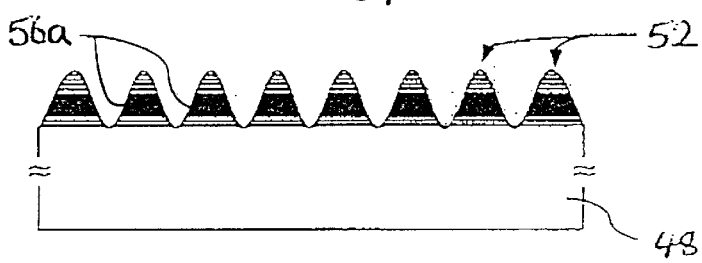

Then, as illustrated in FIG. 4b, the surface is bombarded with 400–500 eV $Ar^+$ ions at approximately $ImA/cm^2$ until the substrate surface is etched out to form a pattern of overlapping nanodots 52 and wells 54 as previously described. Bombardment of the surface is carefully controlled so that the resulting arrangement is a pattern that includes a $Al_{09}Ga_{01}As_{05}Sb_{05}$ layer 56 in each nanodot 52 and in each of the overlapping nanodot portions (not visible).

The pattern of nanodots formed by the bombardment process, as with the other embodiments of the invention, can be any of those shown in FIGS. 1, 2a, or 2b.

In the next step of the method (shown in FIG. 4c), each of the $Al_{09}Ga_{01}As_{05}Sb_{0.5}$ layers 56 are subsequently converted into an aluminium oxide compound 56a by wet thermal oxidation or oxygen plasma. The resulting compound oxide layers thus formed act as a mask for the next step of the method shown schematically in FIG. 4d.

Figure 4D:
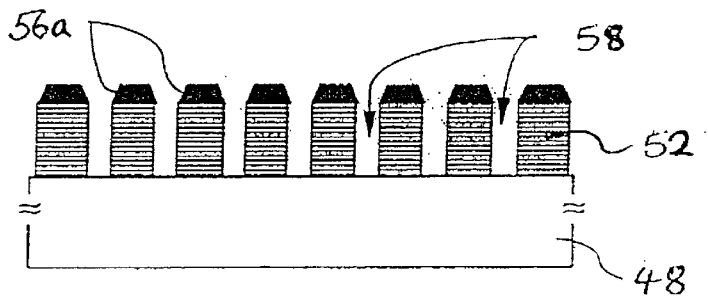

In the next step shown in FIG. 4d, reactive ion etching with oxygen ions (for example) is used to etch deep nanoholes 58 that preferably extend right down to the surface of the substrate 48. As shown in FIG. 4d, the etching step also removes top portions of the nanodots and overlapping nanodot portions provided above the protective aluminium oxide compound layer 56a.

Figure 4E:
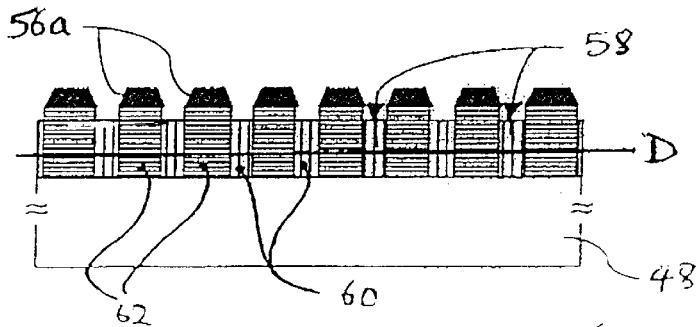
Figure 4F:
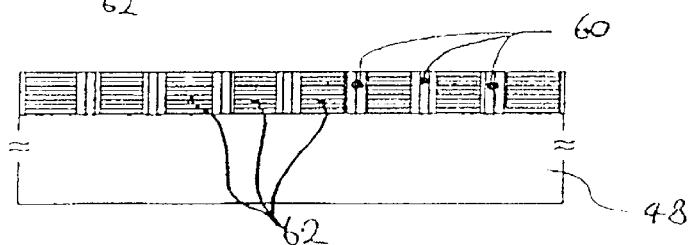

Next, as illustrated in FIG. 4e, electroplating (for example) is used to deposit magnetic materials such as Co, Ni (or any other magnetic material mentioned herein, or otherwise known to persons skilled in the art) into the nanoholes 58, forming a periodic array of nanomagnets 60 separated by non-magnetic material 62.

Once magnetic material has been grown into the nanoholes 58, the next step (illustrated schematically in FIG. 4f) is to remove material to reveal the array of nanomagnets 60 and intervening non-magnetic material 62. This removal step can be accomplished, for example, by polishing the surface down to a depth D that is chosen to be significantly less than the height of the overlap between neighbouring nanodots (formed in the step illustrated in FIG. 4b). Once the polishing has been completed an ordered array of nanomagnets 60 separated by nonmagnetic material 62 is revealed (see FIG. 4f).

Figure 5:
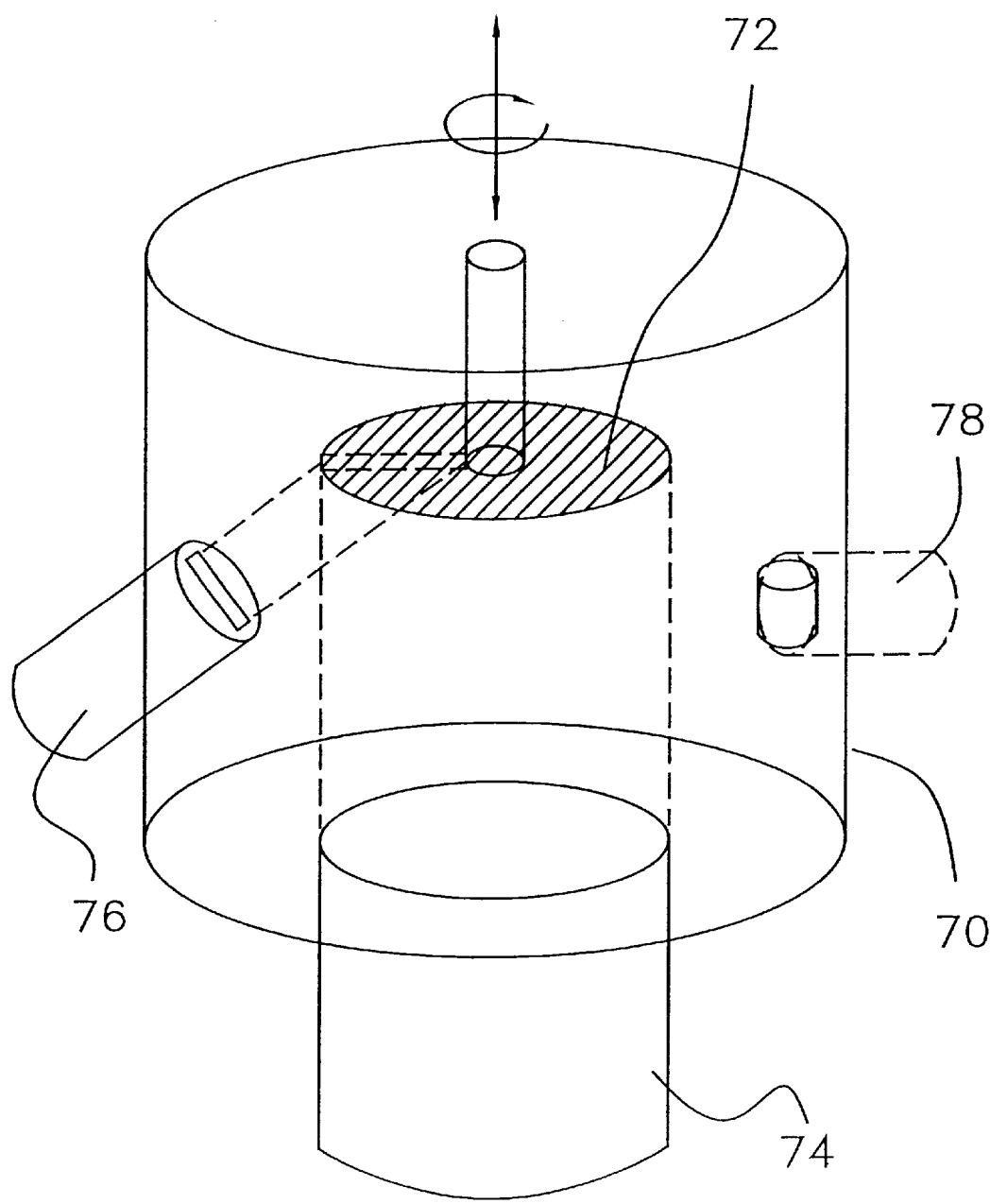
FIGS. 5 and 6a are simplified diagrams of apparatus for use with the fabrication methods of embodiments of the invention.

FIG. 5 is a schematic illustration of apparatus for use with all the embodiments of the method of the invention to form a pattern comprised of hexagonal nanodot clusters or a polar array of nanodot clusters. It should be noted that not all of the components will be used in each pattern.

The apparatus comprises a vacuum chamber 70 that is preferably capable of sustaining a base pressure that is better than $5 \times 10^{-8}$ Torr. Most of the steps of the methods described herein are conducted within the vacuum chamber 70.

A substrate holder 72 is provided on which substrates or substrate carriers up to 2.5 inches (approximately 6.4 cms) in diameter can be mounted. The holder 72 is rotatable (for example up to 100 rpm) and can be cooled (for example down to −20° C.) and heated (for example up to 200° C.) as required for formation of a particular nanodot pattern. The substrate holder 72 can be moved up and down to adjust the distance between the substrate holder 72 and two ion beam sources 74, 76, and also the angle between the surface of a substrate mounted on the holder and an evaporation source 78.

The two ion beam sources 74, 76 can each be "type RR-ISQ 76 ECR" sources manufactured by Roth and Rau Oberflachentechnik GMBH. The first source 74 is operable to provide uniform ion beam bombardment on a substrate surface (preferably with an ion current density distribution that is within ±5% on a 2.5" wafer) at a normal angle of incidence. The second ion source 76 is operable to bombard a radial segment of the substrate with an ion beam at an off-normal angle of incidence, generally in the region of 40 to 60 degrees The second source 76 is adapted to provide a linear or slot-shaped beam that is incident on a similarly slot-shaped radial segment of the substrate. Both argon and oxygen gas are used for the sources (for Ar$^+$ ion bombardment and reactive ion etching). Ion energy is generally in the region of 100–2000 eV and beam current density is generally in the region of 1 mA/cm$^2$. The substrate can be cooled and rotated (for uniformity) during ion bombardment as required for the production of a particular nanodot pattern.

The evaporation source 78 (which could be for example an e-Vap 300 type source manufactured by MDC) is provided to enable thin layers of aluminium, for example, to be deposited on a bombarded substrate under a small angle (see FIG. 3a) while the substrate is rotating.

Figure 6A:
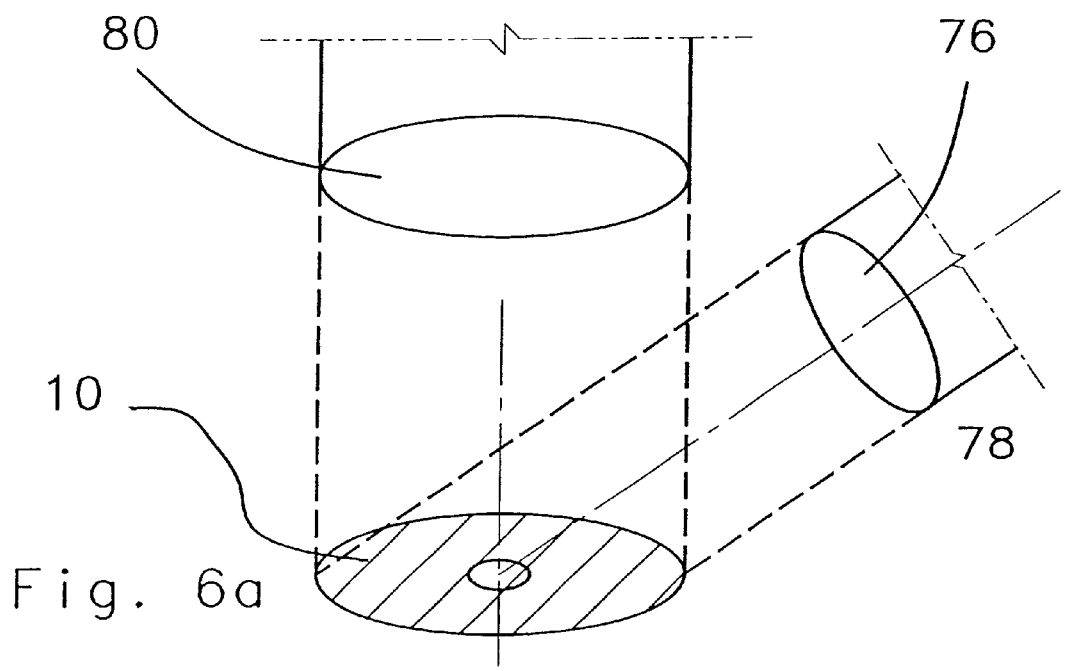
Figure 6B:
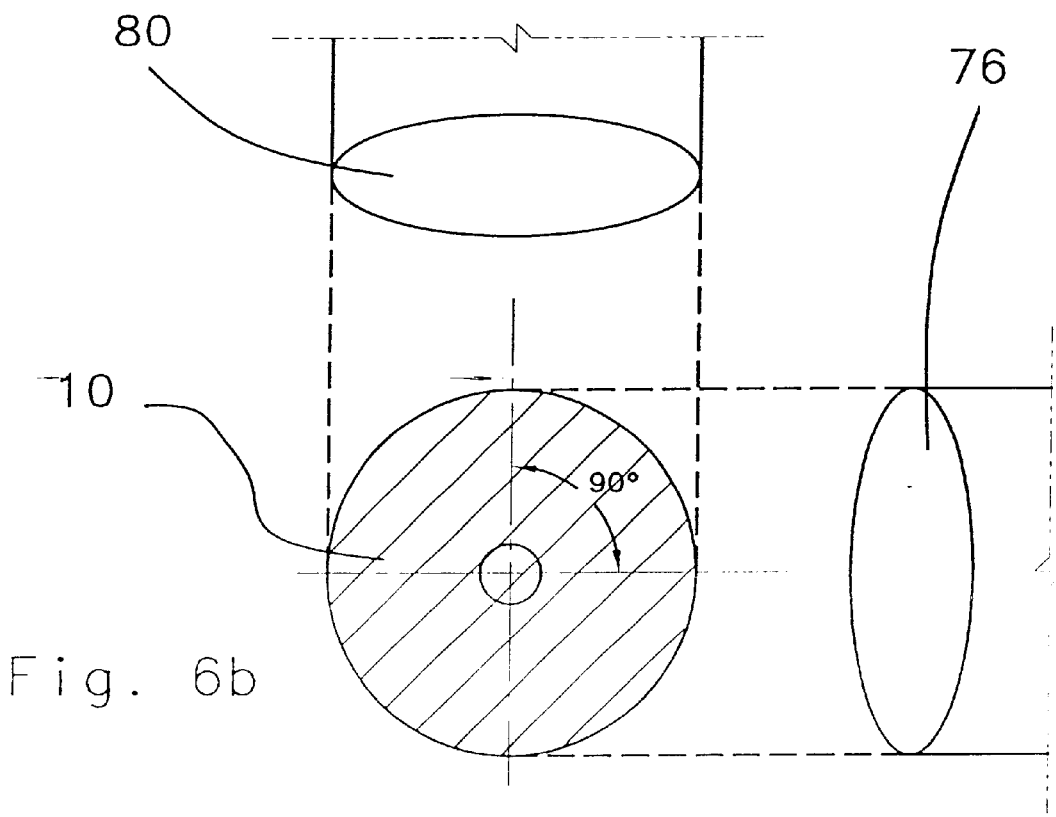

FIGS. 6a and 6b are schematic illustrations of a modification of the apparatus of FIG. 5 which may be used to form the checkerboard pattern of FIG. 2a. The only difference between the apparatus of FIGS. 6a and 6b and the apparatus of FIG. 5, is that the off-normal source 76 is operable to bombard substantially the whole of the substrate with an ion beam at an off-normal angle of incidence, generally in the region of 40 to 60 degrees. The apparatus of FIGS. 6a and 6b preferably also includes an evaporation source (not shown) (which could be for example an e-Vap 300 type source manufactured by MDC) so that thin layers of aluminium, for example, can be deposited on a bombarded substrate under a small angle (see FIG. 3a) while the substrate is rotating.

In the first and third embodiments of the invention, the evaporation source 78 is not used, as the substrate pattern is not covered with a mask. In the second embodiment of the invention the evaporation source is utilised to form a mask on top of the nanodot pattern.

To form the hexagonal nanodot pattern shown in FIG. 1, only the first ion source 74 of the apparatus shown in FIG. 5 is used to irradiate the whole of the substrate. To form the checkerboard pattern shown in FIG. 2a, the apparatus shown in FIGS. 6a and 6b is used. In this case, the whole of the substrate is irradiated for a first time by off-normal ion source 76 without rotating the substrate. The substrate is then rotated by ninety degrees and the whole substrate surface is irradiated for a second time by the off-normal source. As an alternative, the apparatus shown in FIGS. 6a and 6b could be adapted to include another source 80 (shown in ghost) which is identical in all respects to the off-normal source 76 but is located at ninety degrees to the off-normal source 76, and in this alternative the pattern of FIG. 2a could be formed by simultaneously bombarding the substrate with the two sources or by bombarding the substrate with one source and then the other in both cases without rotating the substrate.

To form the polar pattern of FIG. 2b, the apparatus of FIG. 5 is employed to bombard the substrate with ions from both sources at the same time as the substrate is rotated for a full rotation.

Figure 7:
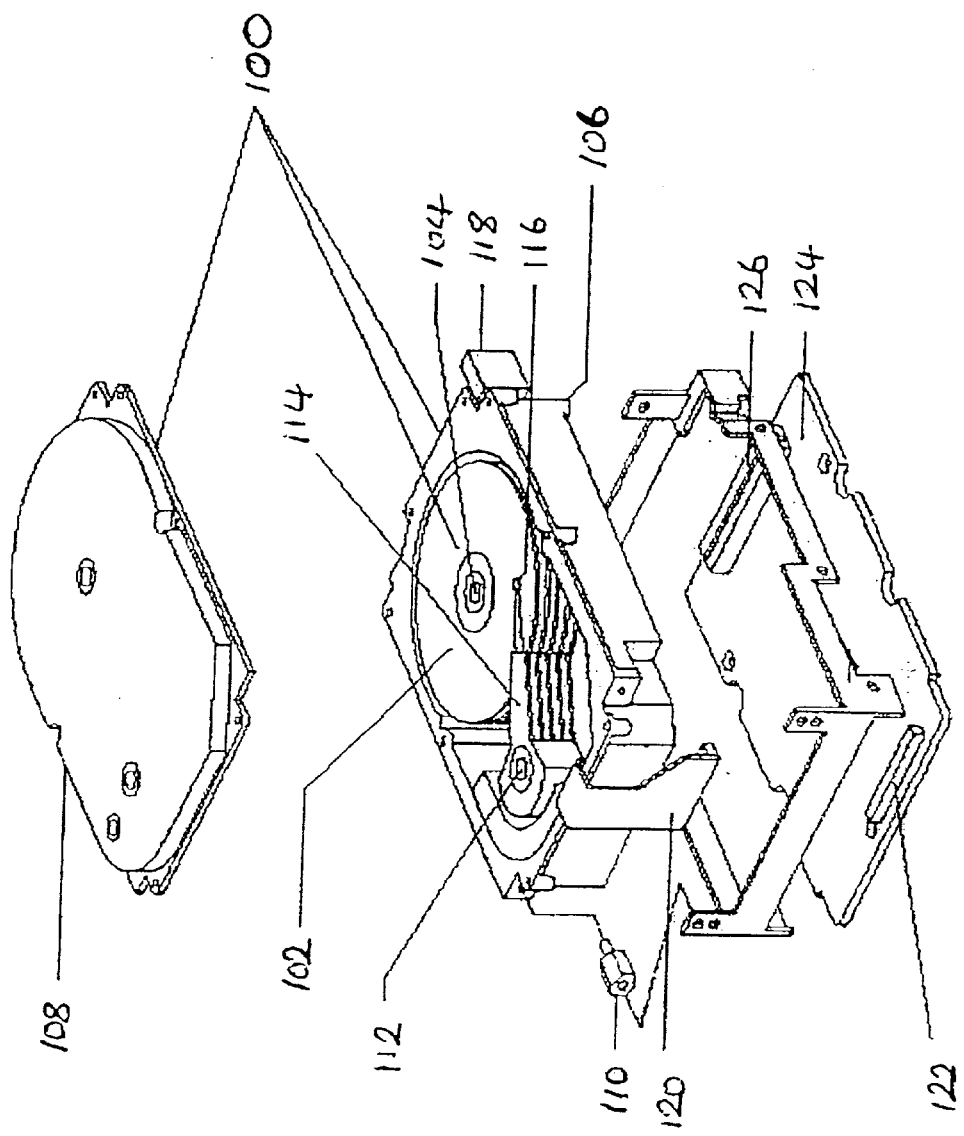
FIG. 7 is a simplified schematic representation of a hard disk drive.

FIG. 7 is a schematic illustration of a HDD assembly 100 that includes a stack of five data storage media 102 (more normally referred to as platters) that have been fabricated in accordance with the methods described herein. The platters are rotatable about a central spindle 104.

The assembly comprises a base assembly 106 onto which a cover 108 can be mounted by means of suitable anti-vibration mountings 110. An actuator 112 is provided within the base assembly 106, and is operable to move five arms 114 (one for each platter) in a radial direction back and forth across the surface of the platters 102. Mounted on the end of each arm 114 is a read/write head 116.

Power for the HDD is provided by means of a DC power inlet 118, and data is read out from the drive by means of a printed circuit cable 120 that is connected by a connector 122 to a printed circuit board 124, that is in turn connected to an input/output interface 126.

Figure 8:
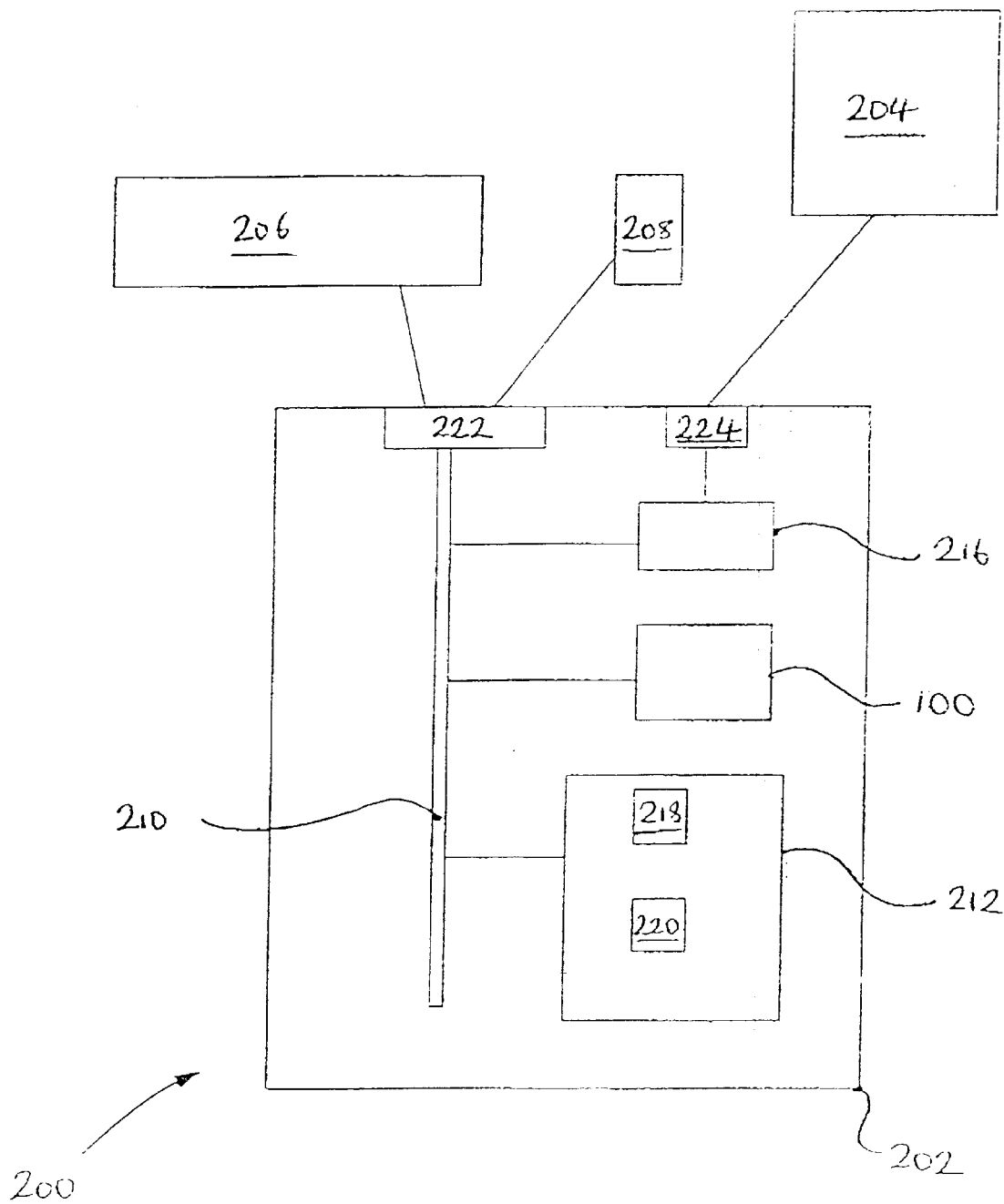
FIG. 8 is a simplified schematic representation of a computer system that employs the HDD of FIG. 7.

FIG. 8 is a simplified schematic illustration of a computer system 200 employing, as a component thereof, the HDD 100 of FIG. 7.

As shown, the computer system comprises a system unit 202 housing electronic components of the computer, a monitor 204, and data input means comprising a keyboard 206 and a mouse 208. Other peripheral devices may be provided if desired.

Within the system unit 202 there is provided a data bus 210 to which a motherboard 212, the HDD 100, and a video card 216 are connected. The motherboard 212 carries a central processing unit 218 and memory 220 (amongst other components). The data bus is connected to an input/output interface 222 so that signals can be input to the data bus (for example by means of the keyboard 206 or mouse 208) and output therefrom. The video card 216 is connected to a video output interface 224 so that video signals can be output to the monitor 204.

It will be understood, of course, that whilst preferred embodiments of the invention have been herein described, persons skilled in the art will readily be able to devise modifications and alterations to the particular embodiments described without departing from the spirit and scope of the invention as defined by the accompanying claims.

For example, whilst the preferred embodiments described above all employ a GaSb substrate, it will be understood by persons skilled in the art that this is not essential, and the substrate could be of any one or more of a number of alternative materials. For example, the substrate could be of germanium (Ge), with the advantage that the nanodots formed by bombarding the surface would be even smaller (and thus provide a higher surface density) than those formed on a GaSb substrate. Alternative substrate materials are: InSb, Si, metals such as Cu, Ag, Au, and amorphous materials such as SiO$_2$.

It will also be apparent to persons skilled in the art that silicon, or any other material that can be converted into a sputter etch-masking material by oxidation or other means, may be used instead of an aluminium compound in the embodiment of FIG. 4.

It will also be apparent to persons skilled in the art that it may be possible to form the nanodots of the aforementioned polar pattern in configurations that are different to the square configuration shown in FIG. 2b. These different configurations may be achieved by varying, for example, the number of ion beams incident on the substrate and/or the angle of incidence. It may also be possible to form the polar pattern by means of normal and off-normal beams which are both incident only on a segment of the substrate as the substrate is rotated.

What is claimed is:

1. A method of fabricating a high-density magnetic data-storage medium, the method comprising the steps of:
   (a) forming a plurality of nanodots of non-magnetic material in a regular array on a surface of a substrate, said array being notionally dividable into a plurality of clusters that each comprise a plurality of nanodots, wherein each nanodot of a said cluster overlaps with neighbouring nanodots of that cluster to form a well between them;
   (b) depositing magnetic material onto said substrate to at least partly fill the wells of each cluster; and
   (c) removing material to reveal a regular array of wells filled with magnetic material, each of said wells being separated from neighbouring wells by non-magnetic material.

2. A method according to claim 1, wherein each of said clusters comprises four nanodots arranged generally in a square with a nanodot at each corner of said square, and a single central well.

3. A method according to claim 2, wherein said clusters are formed in a checkerboard array extending over the whole of said substrate surface.

4. A method according to claim 2, wherein said generally square cluster is formed by bombarding said substrate with an ion beam at an off-normal angle of incidence, rotating the substrate by 90° around an axis normal to the substrate surface, and then bombarding the substrate for a second time with said ion beam at said off-normal angle of incidence.

5. A method according to claim 2, wherein said generally square cluster is formed by bombarding said substrate with two ion beams at the same off-normal angle of incidence from sources located at 90 degrees from one another about the periphery of the substrate, said two sources being arranged to bombard the substrate simultaneously or one after the other.

6. A method according to claim 4, wherein said off-normal angle of incidence is between 40 to 60 degrees.

7. A method according to claim 1, wherein each of said clusters comprises seven nanodots arranged generally in a hexagon with a single central nanodot and six neighbouring nanodots arranged about the periphery thereof, each of said clusters comprising a total of six wells.

8. A method according to claim 7, wherein said generally hexagonal cluster is formed by bombarding said substrate with a substantially uniform ion beam incident on said substrate at an angle that is generally normal thereto.

9. A method according to claim 8, wherein said substantially uniform ion beam is arranged to illuminate substantially all of said substrate.

10. A method according to claim 8, wherein said substrate is rotated whilst being bombarded by said ion beam.

11. A method according to claim 7, wherein said nanodots of a said cluster are arranged in a lattice with a periodicity that is less than approximately 60 nm, and said nanodots each have a height that is less than or equal to approximately 30 nm.

12. A method according to claim 1, wherein said nanodots are formed in a polar array that extends outwardly from the centre of the substrate, each of the clusters of said array comprising four nanodots arranged generally in a square with a nanodot at each corner of said square, and a single central well.

13. A method according to claim 12, wherein said polar array is formed by simultaneously bombarding said substrate with two substantially uniform ion beams while the substrate is rotated.

14. A method according to claim 13, wherein one of said beams is generally circular in cross-section, and the other of said beams is generally rectangular (i.e. slit or slot shaped) in cross-section and incident at an off-normal angle of incidence upon a generally rectangular area of said substrate that extends along a radius of said substrate.

15. A method according to claim 14, wherein said generally circular beam is incident upon substantially the whole of said substrate surface from a generally normal angle of incidence.

16. A method according to claim 14, wherein said off-normal angle of incidence is between 40 to 60 degrees.

17. A method according to claim 1, comprising subsequent to step (a), the further steps of:
(a1) depositing a cap layer on top portions and overlapping portions of said nanodots; and
(a2) removing any nanodot material not covered by said cap layer.

18. A method according to claim 17, wherein said cap layer is deposited by evaporation under a small angle (typically in the region of 0 to 10°, preferably 6°) while the substrate is rotated.

19. A method according to claim 17, wherein said cap layer is of aluminium or silicon.

20. A method according to claim 17, wherein step (a2) is accomplished by etching with oxygen ions or other similarly reactive ions.

21. A method according to claim 1, comprising - prior to step (a)- the further steps of:
depositing an epitaxy layer of a masking material onto a substrate; and
depositing an epitaxy layer of substrate material on top of said masking material layer;
wherein step (a) is arranged to form said plurality of nanodots in such a way that each of said nanodots and overlapping nanodot portions include a layer of said masking material, and said wells do not include a layer of said masking material.

22. A method according to claim 21, comprising— subsequent to Step (a)—the further step of:
(a1) enlarging said wells and oxidising said masking material by means of reactive ion etching.

23. A method according to claim 22, wherein step (a1) is accomplished by etching with oxygen ions or other similarly reactive ions.

24. A method according to claim 21, wherein said masking material comprises $Al_{0.9}Ga_{0.1}As_{0.5}Sb_{0.5}$.

25. A method according to claim 21, wherein said masking material layer and epitaxy substrate layer are deposited by metal-organic vapour phase epitaxy (MOVPE) or molecular beam epitaxy (MBE).

26. A method according to claim 1, wherein said magnetic material can be deposited by electrodeposition, sputtering, or evaporation.

27. A method according to claim 1, wherein said magnetic material is selected from the group consisting of Co, Ni, Fe, CoCrPt, CoPt, FePt, $Mn_3Al$, $SmCo_5$ or multilayer structures such as $(Co/Pt)_n$.

28. A method according to claim 1, wherein said substrate is of a material selected from the group consisting of semiconductors such as GaSb, InSb, Ge, Si, metals such as Cu, Ag, Au, and amorphous materials such as $SiO_2$.

29. A method according to claim 1, wherein said ion source(s) is/are an ECR or RF or DC ion/plasma source with a beam current density distribution over the substrate area that is less than 5%.

30. A method according to claim 1, wherein said ion beams are of $Ar^+$, $Xe^+$, or $Kr^+$ ions having an energy that is in the range 400–2000 eV, and a current density of approximately 1 $mA/cm^2$.

31. A method according to claim 1, wherein the fluence of said ion beam(s) on said substrate is greater than approximately $4 \times 10^{17}$ $ions/cm^2$.

32. A method according to claim 1, wherein said substrate is bombarded for at least 40 s at a current density of approximately 1 $mA/cm^2$.

33. A method according to claim 1, wherein said filled wells have a diameter not exceeding 50 nm.

34. A method according to claim 1, wherein each filled well is capable of storing at least a single bit of data.

35. A method according to claim 1, wherein said removal step (c) is accomplished by polishing.

36. A method according to claim 35, comprising subsequent to step (c) the further step of:
(d) coating said polished substrate with a protective overcoat (such as a diamond-like carbon layer) and preferably also with a lubricant layer.

* * * * *